United States Patent [19]

Armell

[11] Patent Number: 4,805,448
[45] Date of Patent: Feb. 21, 1989

[54] DOWNHOLE PRESSURE AND/OR TEMPERATURE GAUGES

[75] Inventor: Richard A. Armell, Angus, Scotland

[73] Assignee: Drexel Equipment (UK) Limited, London, England

[21] Appl. No.: 86,677

[22] Filed: Aug. 18, 1987

[30] Foreign Application Priority Data

Aug. 20, 1986 [GB] United Kingdom ............... 8620212

[51] Int. Cl.⁴ ............................................. E21B 47/00
[52] U.S. Cl. ........................................ 73/151; 73/733; 73/152
[58] Field of Search ............... 73/151, 152, 706, 756, 73/732–742; 464/57, 60, 162

[56] References Cited

U.S. PATENT DOCUMENTS

| | | | |
|---|---|---|---|
| 1,864,507 | 6/1932 | Pineau | 464/57 |
| 2,343,079 | 2/1944 | Pickwell | 464/60 |
| 2,590,313 | 3/1952 | Hartmann | 346/138 |
| 2,979,925 | 4/1961 | Hungerfords, Jr. | 464/60 |
| 3,068,666 | 12/1962 | Sabadash | 464/60 |
| 3,073,135 | 1/1963 | Wood | 464/162 X |
| 3,633,414 | 1/1972 | Field | 73/152 |
| 3,744,307 | 7/1973 | Harper et al. | 73/152 |
| 3,810,387 | 5/1974 | Stancliff | 73/151 |
| 4,203,305 | 5/1980 | Williams | 464/60 |
| 4,207,755 | 6/1980 | Weible | 464/60 |

Primary Examiner—Eugene R. LaRoche
Assistant Examiner—Seung Ham
Attorney, Agent, or Firm—Leydig, Voit & Mayer

[57] ABSTRACT

A pressure or temperature gauge includes a Bourdon tube which is coupled via a shaft to transmit rotation to a stylus carried by the shaft which makes a record on a cylindrical chart which moves axially of the shaft at a constant rate. The shaft is divided into two sections which are joined together by a flexible coupling; the upper section of the shaft is mounted for angular displacement about its longitudinal axis by the thrust bearing. One section has an integrally formed axial extension which is received in a recess in the facing end portion of the other shaft section. This construction of the stylus shaft allows the angular motion produced by the coiling and uncoiling of the Bourdon type generally through an angle less than 360° to be faithfully transmitted without any axial motion of the shaft which would give rise to erroneous recording of pressure or temperature readings in relation to time.

13 Claims, 2 Drawing Sheets

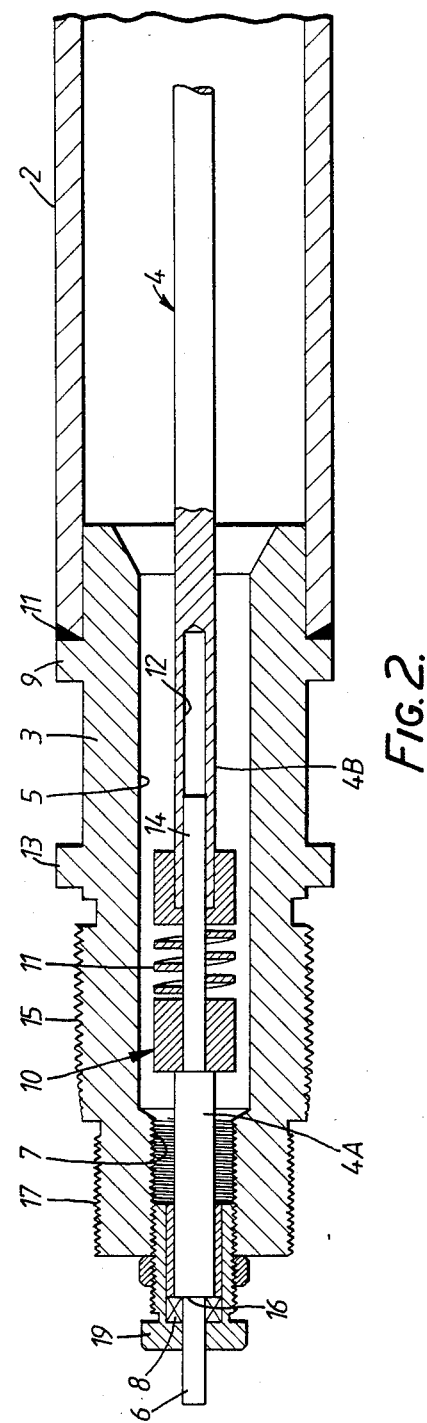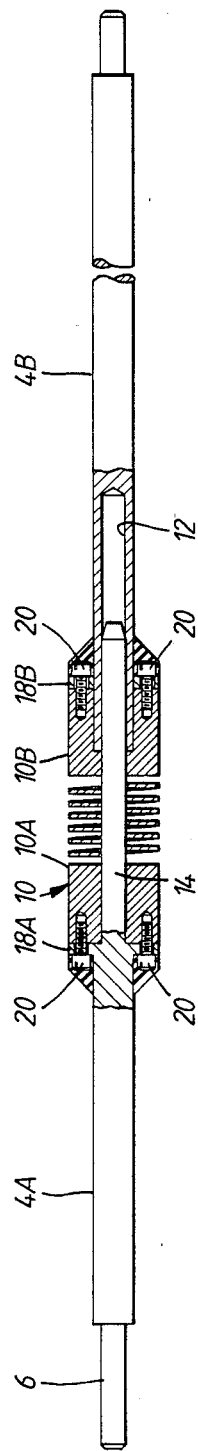

DOWNHOLE PRESSURE AND/OR TEMPERATURE GAUGES

BACKGROUND OF THE INVENTION

1. Field of the Invention

The present invention relates to gauges for measuring either pressure or temperature down the shaft of an oil or gas well.

2. Summary of the Prior Art

Gauges have been proposed comprising a coiled Bourdon tube containing a fluid, which tube deflects angularly about its longitudinal axis in response to pressure or temperature changes, a stylus carried by an elongate member, the elongate member being coupled to the Bourdon tube so as to deflect angularly in opposite senses in response to coiling and uncoiling of the Bourdon tube, a cylindrical recording chart mounted so as to move in a direction parallel to the rotational axis of the elongate member at a constant rate, the stylus being mounted in contact with the chart so as to mark the chart as the elongate member and stylus move angularly so that a plot of pressure or temperature variation with respect to time is produced on the chart.

Such a pressure gauge is manufactured under code DPG125 by the Assignees of the applicant, Drexel Equipment (U.K.) Limited of Aberdeen, Scotland. Such a pressure gauge is also described in U.S. Pat. No. 3,744,307 to Harper et al issued July 10, 1973 and the tubular chart device which is used in such gauges is described in U.S. Pat. No. 2,590,313 to C. H. W. Hartmann issued Mar. 25, 1952.

A technical problem associated with such gauges is that the uncoiling of the Bourdon tube inevitably results in an axial motion as well as angular deflection of the tube so that, with existing couplings between the stylus shaft and the tube the stylus moves axially as well as angularly. This axial movement is in the direction of the time axis so that it causes a distortion in the resulting chart. The amount of axial motion is small but bearing in mind that the chart may be expected to run for many hours, the distortion caused by axial motion is significant.

The pressure range which needs to be recorded is substantial, from 0 to 10,000 lb/sq.in. (0 to 700 kg./sq.cm) is quite normal and an extension of this range to 20,000 lb/sq.in. (1400 kg./sq.cm) is not unusual. It must also be born in mind that the Bourdon tube will only have a maximum angular deflection from 0° to 310° so that in conjunction with the time scale it will be appreciated that any axial motion of the shaft which transmits motion to the stylus will give rise to an appreciable error in the readings as recorded on the chart. This applies more especially when there is a rapid pressure increase or decrease.

In more detail the conventionl chart is customarily 2" (5.08 cm) by 5" (12.7 cm) in size and the associated clock may be required to run for any time in the range 3 to 144 hours. Generally, either a 24 or 48 hour clock will be used for build-up and draw down of a well borehole. An average pressure for the chart will be 7500 psi (527 kg/sq.cm). With parameters such as these, it is not difficult to appreciate that the transmission of axial motion of the Bourdon tube to the stylus will have an adverse effect. FIG. 1 illustrates one specific problem area on a typical chart. Rapid "draw-downs" and "build-ups" of pressure means that the rate of change with time will be critically adversely affected if the axial motion of the Bourdon tube or other sensing device is transmitted to the stylus. The slope of the pressure curve is, in most instances, more important than accuracy, as such, of the pressure (or temperature) reading.

Previously the problem has been at least partially met by special calibration and/or by computer-aided compensation.

Accordingly, an object of the present invention is to solve the technical problem of providing a coupling between the stylus and a Bourdon tube such that the motion between the stylus and the chart is solely a function of elapsed time.

SUMMARY OF THE INVENTION

According to the present invention there is provided in an assembly for continuously monitoring down-hole pressures or temperature parameters in an oil or gas well or other remote location accessible only along a narrow passageway, means defining a sensing element having a longitudinal axis and two further axes each orthogonal to the longitudinal axis, the sensing element being subject to angular deflection over a limited range in response to any change in the parameter being measured and motion in the direction of the longitudinal axis of the sensing element, means for recording on a continuous basis the said changes in the parameter sensed by the sensing element and converted to said angular deflection, elongate means for coupling the sensing element and the continuous recording means, means supporting the elongate means at spaced locations along the length of the elongate means, the supporting means including an elongate housing, and a compliant device interposed along the length of the elongate coupling means, said compliant device exhibiting torsional rigidity such that the angular deflection of the sensing element is transmitted with high precision to the recording means while any motion of the sensing element in the direction of said longitudinal axis is accommodated by the compliant device substantially without transmission of the motion of the sensing element in the direction of the longitudinal axis of the sensing element.

Further according to the present invention there is provided in an assembly for monitoring over a required time period down-hole pressures or temperature parameters in an oil or gas well or other remote location accessible only along a narrow bore, means defining a sensing element of helical form having a longitudinal axis and two further axes each orthogonal to the longitudinal axis, the helical sensing element being subject to angular motion in the direction of the longitudinal axis, chart means for recording the said changes in the parameter sensed by the helical sensing element and converted to said angular deflection, elongate shaft means coupling the helical sensing element and the chart recording means, means for supporting the elongate shaft means at spaced locations along the elongate shaft means, the supporting means including an elongate housing, and bearing means interposed between the internal housing wall and the elongate shaft means at each of said spaced locations, and a selective motion transmitting device interposed along the length of the elongate coupling means, said motion transmitting device exhibiting torsional rigidity such that the angular deflection of the sensing device is transmitted with high precision to the chart recording means while any motion in the direction of said longitudinal access of the helical sensing element resultant from the parameter being monitored axis is accommodated by the selective motion transmitting device substantially without transmission of motion along said longitudinal axis to the recording means, the assembly serving to record over a predetermined time period the parameter sensed by the said helical sensing element substantially without error resultant from the effect of the motion of the sensing element along the longitudinal axis of the sensing element.

Still further according to the present invention there is provided in an assembly for continuously monitoring over a required period of time down-hole pressure or temperature parameters in an oil or gas well or other remote location accessible only along a narrow passageway, a helical Bourdon tube having a longitudinal axis and two further axes each orthogonal to the longitudinal axis, the Bourdon tube being subject to angular deflection over a limited range in response to any change in the parameter being measured and motion in the direction of the longitudinal axis, stylus and chart means for recording on a continuous basis the said changes in the parameter sensed by the Bourdon tube, an elongate two-part shaft for coupling the Bourdon tube and the stylus, means for supporting the elongate shaft at spaced locations along the length of the elongate shaft, the supporting means including an elongate hollow, cylindrical housing, bearings spaced along the length of the shaft and mounted on the inner wall of the housing, and a selective motion transmitting device interposed between the two parts of the shaft, said selective motion-transmitting device exhibiting torsional rigidity such that the angular deflection of the Bourdon tube is transmitted with high precision to the stylus while any motion of the Bourdon tube in the direction of said longitudinal axis is accommodated by the motion-transmitting device substantially without transmission of the axial motion to the stylus, the assembly serving to record over a predetermined time period the parameter sensed by the sensing element substantially without error resultant from the effect of the motion of the Bourdon tube along the longitudinal axis of the Bourdon tube.

The gauge as described is advantageous in that it allows the vertical movement to be absorbed without creating friction, back pressures or torque on the Bourdon tube which could affect the accuracy of the measurements made by the gauge.

The compliant device may comprise a flexible coupling and the device may be placed at any location along the shaft or other elongate member between the point of location of the Bourdon tube or other sensing element and the stylus. The use of such a guide rod substantially prevents any tendency of the coupling to bow.

BRIEF DESCRIPTION OF THE DRAWINGS

A pressure or temperature gauge embodying the invention will now be described, by way of example only, with reference to the accompanying diagrammatic drawings in which:

FIG. 2 is a longitudinal section through one end portion of a gauge showing the novel portion in accordance with the invention of a stylus shaft; and FIG. 3 is a longitudinal section, to an enlarged scale, of the novel portion of the shaft in a modified version.

DESCRIPTION OF THE PREFERRED EMBODIMENT

Figure 1:
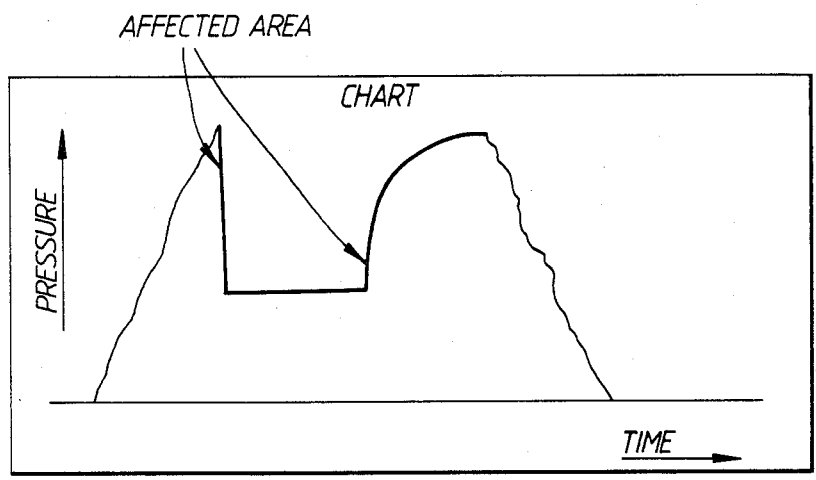
FIG. 1 is a graph illustrating pressure changes with time for a conventional down-hole pressure gauge recorder.

FIG. 2 illustrates only a detail of the upper end portion of the pressure or temperature gauge embodying the invention. Since the construction of the pressure or temperature sensing elements and the cylindrical recording chart are essentially conventional, they may be in accordance with any of the known designs suitable for the intended use. Reference may be made to U.S. Pat. Nos. 3,744,307 and 2,590,313 referred to above for illustrative examples of these conventional portions of the assembly. These U.S. patent specifications are incorporated herein by reference.

The gauge comprises an elongate, hollow, cylindrical housing 2 in the bottom portion of which, to the left in the drawing, there is a bellows arrangement (not shown) containing a hydraulic fluid. The exterior of the bellows is in contact with the well fluid so that the pressure of the well fluid is transmitted to the hydraulic fluid inside the bellows. The interior of the bellows communicates with the interior of a sensing element, here in the form of a coiled Bourdon tube which is also accommodated inside the housing 2. One end of the Bourdon tube is rigidly fixed relative to the housing 2 at the end of the latter remote from the illustrated end. The other end of the Bourdon tube is free for angular deflection relative to the fixed end as the Bourdon tube coils or uncoils in response to variations in the pressure within the hydraulic fluid contained in the tube, these variations being dependent upon either the temperature or pressure of the well fluid.

The housing 2 is welded at the end shown to a housing extension 3 which is of machined metal such as stainless steel. The extension 3 has a stepped bore 5,7 co-axial with the housing 2, the bore 7 being screw threaded for a reason to be given hereinafter. Externally, the extension 3 has an integral annular flange 9 one face of which is welded at 11 to the end as shown of the housing 2. A further annular flange 13 provides an abutment for locating the extension 3 relative to a mounting, not shown.

The extension also has two screw threaded external sections 15,17 which enable securing to the mounting (not shown).

A stylus shaft 4 or other elongate angular deflection transmitting means is coupled to the free end of the Bourdon tube in a known manner so that as the free end of the Bourdon tube deflects angularly about its longitudinal axis in response to coiling or uncoiling of the tube, the shaft 4 also deflects angularly. This coupling may be of any known construction. The end portion of the shaft 4 adjacent the coupling is mounted in a bearing which permits the angular deflection with minimum friction and which is fixed relative to the housing 2. The other end portion 6 of the stylus shaft 4 is received in an upper (when located in a borehole) bearing 8. This bearing may be a jewel bearing and is mounted in a bearing housing 19 which is externally screw-threaded and is engaged in the screw-threaded bore 7. The end portion 6 of the stylus shaft 4 is connected to a known type of stylus (not shown) which co-operates with a cylindrical chart which is controlled by a clock device to move axially of the housing and shaft at a fixed rate. Therefore, as the stylus shaft 4 deflects angularly about its longitudinal axis, the stylus moves circumferentially around the chart. This circumferential motion together with the axial motion which is a linear function of time produces a plot of pressure (or temperature) against time on the chart.

The gauge described is a pressure gauge. However, if the hydraulic fluid within the Bourdon tube is replaced by an appropriate liquid/gas and is in temperature communication with the fluid in the well, a temperature gauge is produced. Such a temperature gauge does not, of course, require the bellows arrangement of the pressure gauge.

As so far described, the pressure gauge is of conventional construction. In accordance with the present invention, the stylus shaft 4 is divided into two sections 4A, 4B which are connected to each other by being rigidly fixed to opposite end portions of a compliant device (selective motion transmitting device), here in the form of a flexible coupling 10. Suitable flexible couplings are manufactured by Helical Products Company Inc under the trade mark HELI-CAL and in accordance with U.S. Pat. No. 3,068,666. Such a coupling comprises a hollow cylindrical member with at least an intermediate portion 11 of the cylindrical wall cut through in a helical manner to define a helically wound spring portion which reliably transmits angular deflection but takes up axial movement between the shaft sections by compressing or expanding the adjacent turns of the helix together. The manufacturers specify such coupling for many uses all of which involve rotary motion some uses involving high RPM up to a stated maximum of 50000. None is concerned with the transmission of an angular motion where the maximum angular deflection is less than 360°. The connection between the flexible coupling and the shaft sections may be by means of a clamping fixing, by welding or brazing or the flexible coupling may be integrally formed with one section of the shaft. A preferred fixing mode is illustrated in FIG. 3 and will be described further hereinafter. As will be appreciated it is important that the coupling will transmit the angular deflection of the sensing element with precision to the recording means.

The end portion of the stylus shaft section 4, is provided with an axially-extending recess 12. The end portion of the shaft section 4A is integrally formed with a projecting axial extension 14 which serves as a guide rod and passes through the centre of the flexible coupling 10 and has its end portion received in a recess 12 formed in the end portion 4B of the shaft 4. As illustrated, the extension 14 is slidably received in the recess 12.

The bearing 8 for the upper section 4B of the stylus shaft in the housing 2 is preferably a thrust bearing which replaces the jewel bearing which has conventionally been used but the conventional bearing is also acceptable. The thrust bearing 8 permits the shaft to deflect angularly about its longitudinal axis with minimum friction but axial movement of the shaft with respect to the bearing is not permitted since the shaft is reduced in diameter at an annular shoulder 16 so that a portion 6 of the shaft which extends through the bearing is of lesser diameter than the shaft portion 4A. The thrust bearing 8 is a conventional ball bearing with shields.

The use of a thrust bearing 8 is possible because any axial movement of the shaft 4 owing to the coiling or uncoiling of the Bourdon tube is taken up by the flexible coupling 10 which still, however, passes on all angular deflection about the longitudinal axis without creating any back pressure or torque in the Bourdon tube. The provision of the axial extension 14 prevents any bowing of the flexible coupling 10.

Reference will now be made to FIG. 3 in which the connections of the shaft sections 4A and 4B to the coupling 10 are shown in more detail. The parts have been given the same reference numerals and will not be further described except in relation to those features not illustrated in FIG. 2. The shaft section 4A has mounted adjacent a step at the junction with extension 14 an annular flange 18A with four equally spaced bores extending parallel to the shaft 4. Similarly the shaft section 4B has an annular flange 18B. The coupling end portions 10A and 10B have corresponding blind bores and the portions 10A and 10B are rigidly secured to the respective annular flanges and thence to the shaft sections 4A, 4B by set bolts 20.

The assembly for continuously monitoring over a required period of time downhole pressures or temperatures in an oil or gas well or other remote location only along a narrow passageway, as hereinbefore described, is believed to have one or more of the following advantages:

1. An acceptable degree of accuracy and precision is possible, even when sudden changes in the parameter being recorded occur.
2. The assembly can be used under conditions of elevated temperature of the order of 400° Celcius or even higher.
3. The assembly is adequately robust to withstand oil and gas field conditions;
4. The additional cost in relation to corresponding conventional assemblies is acceptable;
5. The risk of malfunction under arduous downhole conditions is minimal because no delicate parts and no unacceptable tolerance limitations have been involved.
6. The flexible coupling of the preferred embodiment permits accidental shocks to the assembly to be absorbed.

What is claimed is:

1. In an assembly for continuously monitoring downhole pressure or temperature parameters in an oil or gas well or other remote location accessible only along a narrow passageway,
   means defining a sensing element having a longitudinal axis and two further axes each orthogonal to the longitudinal axis, the sensing element being subject to angular deflection about the longitudinal axis over a limited range in response to any change in the parameter being measured and motion in the direction of the longitudinal axis of the sensing element,
   means for recording on a continuous basis the said changes in the parameter sensed by the sensing element and converted to said angular deflection,
   elongate means coupling the sensing element and the continuous recording means,
   means supporting the elongate means at spaced locations along the length of the elongate means, the supporting means including
   an elongate housing, and
   a compliant device interposed along the length of the elongate coupling means, said compliant device exhibiting torsional rigidity such that the angular deflection of the sensing element is transmitted with high precision to the recording means while any motion of the sensing element in the direction of said longitudinal axis is accommodated by the compliant device substantially without transmission of the motion of the sensing element in the direction of the longitudinal axis of the sensing element.

2. In an assembly for monitoring over a required time period down-hole pressure or temperature parameters in an oil or gas well or other remote location accessible only along a narrow bore,
means defining a sensing element of helical form having a longitudinal axis and two further axes each orthogonal to the longitudinal axis the helical sensing element being subject to angular motion in the direction of the longitudinal axis,
chart means for recording the said changes in the parameter sensed by the helical sensing element and converted to said angular deflection,
elongate shaft means coupling the helical sensing element and the chart recording means,
means for supporting the elongate shaft means at spaced locations along the length of the elongate shaft means, the supporting means including
an elongate housing, and
bearing means interposed between the internal housing wall and the elongate shaft means at each of said spaced locations, and
a selective motion transmitting device interposed along the length of the elongate shaft coupling means, said motion transmitting device exhibiting torsional rigidity such that the angular deflection of the sensing element is transmitted with high precision to the chart recording means while any motion in the direction of said longitudinal axis of the helical sensing element resultant from the parameter being monitored is accommodated by the selective motion transmitting device substantially without transmission of motion along said longitudinal axis to the recording means,
the assembly serving to record over a predetermined time period the parameter sensed by the said helical sensing element substantially without error resultant from the effect of the said motion of the sensing element in the direction of the longitudinal axis of the helical sensing element.

3. In an assembly for continuously monitoring over a required period of time down-hole pressure or temperature parameters in an oil or gas well or other remote location accessible only along a narrow passageway,
a helical Bourdon tube having a longitudinal axis and two further axes each orthogonal to the longitudinal axis, the Bourdon tube being subject to angular deflection over a limited range in response to any change in the parameter being measured and motion in the direction of the longitudinal axis,
stylus and chart means for recording on a continuous basis the said changes in the parameter sensed by the Bourdon tube,
an elongate two-part shaft for coupling the Bourdon tube and the stylus,
means for supporting the elongate shaft at spaced locations along the length of the elongate shaft, the supporting means including
an elongate hollow, cylindrical housing,
bearings spaced along the length of the shaft and mounted on the inner wall of the housing, and
a selective motion transmitting device interposed between the two parts of the shaft, said selective motion-transmitting device exhibiting torsional rigidity such that the angular deflection of the Bourdon tube is transmitted with high precision to the stylus while any motion of the Bourdon tube in the direction of said longitudinal axis is accommodated by the motion-transmitting device substantially without transmission of the axial motion in the direction of the longitudinal axis to the stylus,
the assembly serving to record over a predetermined time period the parameter sensed by the Bourdon tube substantially without error resultant from the effect of the motion of the Bourdon tube in the direction of the longitudinal axis of the Bourdon tube.

4. An assembly according to claim 1, wherein the compliant device comprises
a first end part,
a second end part, and
a helical connection part, interconnecting the said first and second parts, and
means for securing the first and second parts to the elongate coupling means.

5. An assembly according to claim 4, wherein said first and second end parts are each of hollow cylindrical form.

6. An assembly according to claim 4 wherein the securing means comprise set bolts extending parallel to the axis of the elongate coupling means, and
flange means on the elongate means by which the compliant device is secured to the elongate means.

7. An assembly according to claim 6 wherein the elongate means comprises
a first shaft section, and
a second shaft section,
one shaft section being received for relative axial movement in the second shaft section.

8. An assembly according to claim 1 wherein the housing comprises a tubular member to one end of which, remote from the recording means, the sensing element is secured.

9. An assembly according to claim 8 comprising a further housing coaxial with the tubular member, the further housing including external screw thread means by which it can be mounted.

10. An assembly according to claim 2, wherein the compliant device comprises
a first end part,
a second end part, and
a helical connection part, interconnecting the said first and second parts, and
means for securing the first and second parts to the elongate coupling means.

11. An assembly according to claim 3 wherein the selective-motion transmitting device comprises
a first end part,
a second end part, and
a helical connection part, interconnecting the said first and second parts, and
means for securing the first and second parts to the elongate two-part shaft.

12. An assembly according to claim 9 wherein the first and second parts are of hollow cylindrical form.

13. An assembly according to claim 10 wherein the first and second parts are of hollow cylindrical form.

* * * * *